United States Patent
Compiano (10) Patent No.: US 7,440,923 B1
(45) Date of Patent: Oct. 21, 2008

(54) METHOD AND APPARATUS FOR PREAUTHORIZING ELECTRONIC FUND TRANSFERS WITHOUT ACTUAL WRITTEN AUTHENTICATION

(75) Inventor: Craig M. Compiano, Oakland, CA (US)

(73) Assignee: The Western Union Company, Englewood, CO (US)

( * ) Notice: Subject to any disclaimer, the term of this patent is extended or adjusted under 35 U.S.C. 154(b) by 764 days.

(21) Appl. No.: 09/317,785

(22) Filed: May 24, 1999

(51) Int. Cl.
G06Q 40/00 (2006.01)

(52) U.S. Cl. .......................... 705/44; 705/35
(58) Field of Classification Search ............. 705/39–44, 705/35, 36, 38, 10, 14
See application file for complete search history.

(56) References Cited

U.S. PATENT DOCUMENTS

| | | | |
|---|---|---|---|
| 5,496,991 A * | 3/1996 | Delfer et al. | 235/379 |
| 5,649,117 A | 7/1997 | Landry | |
| 5,749,075 A | 5/1998 | Toader et al. | |
| 5,794,207 A * | 8/1998 | Walker et al. | 705/1 |
| 5,875,437 A * | 2/1999 | Atkins | 705/40 |
| 5,878,404 A * | 3/1999 | Stout, Jr. et al. | 705/38 |
| 6,014,635 A * | 1/2000 | Harris et al. | 705/14 |

(Continued)

FOREIGN PATENT DOCUMENTS

| | | |
|---|---|---|
| FR | 2728983 A1 | 7/1996 |
| WO | 96/36926 | 11/1996 |

OTHER PUBLICATIONS

"Residential Mortgage Lending", Dennis, marshall W., Robertson, Michael J. Prentice Hall, c1995, ISBN 0131838156.*

Brandel, Roland E., Schellie, Peter D.., "Electronic Fund Transfer Act", The Business Lawyer. Chicago: Apr. 1980.vol. 35, Iss. 3; p. 1275.*

(Continued)

Primary Examiner—Ojo O Oyebisi
(74) Attorney, Agent, or Firm—Townsend and Townsend and Crew LLP (57) ABSTRACT

A method and apparatus for preauthorizing electronic fund transfers from a consumer's bank account without obtaining actual written authentication from the consumer is implemented in connection with a direct marketing strategy for a financial product which, in the presently preferred embodiment of the invention, is a mortgage acceleration program. The invention provides for the mailing of a solicitation to a consumer, i.e. a prospective customer, based upon such factors as mortgage data that the financial institution may posses concerning the consumer. The mailing includes an authorization and passcode which, in the presently preferred embodiment of the invention, is an ACH authorization and passcode. When the consumer receives the solicitation, he may decide to enroll in the mortgage acceleration program. The consumer places a telephone call to a telemarketing organization at a telephone number that accompanied the solicitation. The consumer provides the passcode to a representative of the telemarketing organization and the telemarketing organization attempts to verify the passcode. If the passcode is successfully verified, then the consumer is enrolled in the mortgage acceleration program. Thus, the invention provides a deceptively simple and specific implementation of the "similarly authenticated" requirement of the EFTA that is applicable to direct marketing solicitations made by, or on behalf of, financial institutions. That is, the passcode provided by the consumer meets the requirement of a "digital signature or other code." Yet, the consumer is not required to provide an actual written signature, nor is the consumer required to use a computer or other electronic means to conclude the transaction.

27 Claims, 7 Drawing Sheets

U.S. PATENT DOCUMENTS

| | | | | |
|---|---|---|---|---|
| 6,055,513 | A * | 4/2000 | Katz et al. | 705/10 |
| 6,173,272 | B1 * | 1/2001 | Thomas et al. | 705/42 |
| 6,205,437 | B1 * | 3/2001 | Gifford | 705/75 |
| 6,269,347 | B1 * | 7/2001 | Berger | 705/38 |
| 6,336,104 | B1 * | 1/2002 | Walker et al. | 705/26 |
| 2001/0013017 | A1 * | 8/2001 | Berger | 705/38 |

OTHER PUBLICATIONS

Cloyde, Jan Riggs. ,"Ideas for Improving Funds Transfer Department's Security", American Bankers Association. ABA Banking Journal. New York: Jun. 1980.vol. 72, Iss. 6; p. 70.*

Weinstein, Michael. "FED Eyes Automatic Debits for Biweekly Mortgage Payments", American Banker. New York, N.Y.: Jan. 8, 1986. p. 10.*

Binder, Mary S.., "Negotiating Agreements for Telephonic and Electronic Funds Transfer Services" Banking Law Review. New York: Fall 1991.vol. 4, Iss. 2; p. 10, 11 pgs.*

Anonymous., "Processing: Third-Party Processor Addresses Banks' Risk Concerns Head on Corporate Eft Report." Potomac: Feb. 26, 1992.vol. 12, Iss. 12; p. 4.*

Kenneth Harney. , "How to Read That Letter About Paying Mortgage Biweekly; [Fourth Edition]", The Oregonian. Portland, Or.: May 14, 1993. p. D.01-.*

Jonathan S. Hornblass. Quick Repayment Plans are Doing a Brisk Business Series: 11 American Banke (pre-1997 Fulltext). New York, N.Y.: Mar. 14, 1994.vol. 159, Iss. 49; p. 9.*

Anonymous., "Federal Reserve Board" ABA Bank Compliance. Washington: Apr. 1996.vol. 17, Iss. 4; p. 1, 3 pgs.*

Thoren-Peden, Deborah, Elerding. Gene R. , "Compliance Issues in Cyberspace" ABA Bank Compliance. Washington May/Jun. 1996. vol. 17, Iss. 5; p. 12, 11 pgs.*

Anonymous., "Six Rule Changes Take Effect This Month", Payments System Report. Herdon: Sep. 1996.vol. 11, Is 9; p. 1, 2 pgs.*

Brandel, Roland E, Adams, Lee S. , "The Moderization of Regulation E", ABA Bank Compliance. Washington: Jan./Feb. 1997.vol. 18, Iss. 1; p. 12, 10 pgs.*

Cheatham, Charles., "Electronic Disclosure Under Regulation E", Oklahoma Banker. Oklahoma City: Mar. 27, 1998.vol. 88, Iss. 7; p. 9, 1 pgs.*

Valerie Moss. , "FED Oks Electronic EFTA Disclosure Delivery" Credit Union Magazine. Madison: May 1998. Vo 64, Iss. 5; p. 33, 2 pgs.*

Scott Burns, "Consider the Do-It-Yourself Mortgage Accelerator Plan; [Metro Edition]". Star Tribune Minneapolis, Minn.: Jun. 21, 1998. p. O2.D.*

"Bisaver Enrollment Center", Douglas Michaels Co Fax dated Feb. 28, 2005 examples of "in public use or on sale", pp. 1-13.*

US 5,351,994, 10/1994, Pollin (withdrawn)

* cited by examiner

MARKET STREET MORTGAGE

Equity Accelerator
P.O. Box 191090
San Francisco, CA 94119-1090

(800)806-6646

Justine Su
Three Embarcadero Center, Suite 500
San Francisco, CA 94111-4008

March 20, 1999

Reference #: 999999999

Dear Jusine Su:

I recently sent you some information explaining how you can reduce your mortgage debt by using our electronic payment option, Equity Accelerator.

Why am I writing you again? Because I truly believe the advantages of this service are too important to overlook. Aslo, just in case you didn't get to read the materials before, I am sending you this special Offer so that you can see for yourself what many of our other customers have already found out: Equity Accelerator makes debt reduction convenient and most importantly...easy on your budget. And, you can begin this proben savings program with NO refinancing, NO application fee and NO changes to your current mortgage. The following chart summarizes how you will personally save time and money by using Equity Accelerator.

| Your Loan # SAMPLE | Your Current Monthly Payment | Equity Accelerator® Biweekly Transfers | Equity Accelerator® Advantage |
|---|---|---|---|
| Payment Amount: | $950.66 per month | $477.83 every 2 weeks | Simplified Budgeting! |
| Total Interest Paid: | 176,911.00 | $131,300.08 | $45,610.92 Saved! |
| Loan Payoff in: | 29 years 0 months | 22 years 3 months | 6 years 9 months early! |
| Total Equity after 10 years: | $15,799.63 | $27,846.20 | $12,046.57 More Equity! |

(See Fig. 1B)

FIG. 1A

*(See Fig. 1A)*

How will the program work for you? Equity Accelerator will electronically deduct a portion of your mortgage payment from your designated checking account after each payday (weekly, every two weeks, twice per month or monthly). We will then automatically make each payment for you based on the monthly due date. By making payments this way, you accumulate extra funds that are applied directly to principal. What's the advantage? Equity Accelerator will make your payments more convenient and earn you big savings on your mortgage.

How big? Just look at your Estimated Personal Benefits Statement (other side) and you'll quickly discover how Equity Accelerator will build your equity faster (that's called Equity Advantage) and significantly reduce your interest payments (Interest Savings), even if you sell your home or refinance your mortgage.

Now is the time to take advantage of your Equity Accelerator savings! How can you get started? It's easy. Call 800-803-6646 to speak with one of our Equity Accelerator Specialists. They can answer any of your program questions or further customize your program benefits. If you would like, they can immediately enroll you right over the phone! If you would prefer, you can enroll by mail.

If you have any program questions or need enrollment assistance, please call for an Equity Accelerator Specialist at (800) 803-6646 between 9:00 AM – 9:00 PM (ET) Monday through Friday.

Yours truly,

Nancy A. Jones
Senior Vice President

This program and the services undertaken by Market Street Mortgage in no way alter or lesson Customer's obligation under Customer's existing mortgage contract regarding the amount of the monthly payments, when payments are due, the application of payments, the assessment of late charges or the calculation of delinquencies.

The Market Street Mortgage Equity Accelerator® Enrollment Card

YES! I want to open the Market Street Mortgage Equity Accelerator Plan. For greatest savings, return card by: April 17, 1999

*(See Fig. 1C)*

*FIG. 1B*

*Just follow these easy steps to enroll. It costs nothing to get started!*

*(See Fig. 1B)*

16

To Enroll by Phone:

1. Call 800-803-6646 to reach and Equity Accelerator Specialist. — 17
2. The Enrollment Specialist will answer any questions you have and verify your enrollment information
3. Read the Equity Accelerator Authorization (other side) and provide the Enrollment Passcode to the Equity Accelerator Specialist. By submitting the Enrollment Passcode, you are acknowledging that you have read and agree to the Equity Accelerator Authorization (other side).

Enrollment Passcode: Just234-5678 ——— 18

Reminder: Before we make any withdrawls from your account, you will receive a "Welcome" Letter specifying the exact funds transfer dollar amounts and dates. Equity Accelerator will make your regular mortgage payment beginning the month after withdrawls have begun from your account. Any questions? Call one of our Equity Accelerator Specialists at (800) 803-6646.

14

To Enroll by Mail:

1. Fill in the missing information.   Reference # 999999999

Name ______________________

Social Security # ______________________

Home Phone # ______________________

2. Enclose a check marked "VOID" (to indicate the account from which your mortgage payments will be electronically transferred). Sign the Authorization and mail this card, along with your "Voided" check, in the postage-paid envelope– TODAY!

3. By signing below, I acknowledge that I have read and agree to the Equity Accelerator Authorization (other side).

Signature: ______________________   Date: ______________

Estimated Personal Benefits Statement

Justine Su
Three Embarcadero Center, Suite 500
San Francisco, CA 94111-4008

Reference #: 999999999
Prepared as of: 02/12/1999

Summary of Your Program Savings

Interest Savings: $45,610.92
Term Reduction: 6 years 9 months
Equity Advantage: $12,046.57 Additional Equity in 10 Program Years Loan #: SAMPLE
PLEASE NOTE: Recent payment of change (if any) may not be included.

Your Current Home Loan

| | | | |
|---|---|---|---|
| Monthly Principal/Interest: | $ 796.61 | Loan Type: | Fixed |
| Escrow/Other Accounts: | $ 154.05 | Current Interest Rate: | 7.875% |
| Monthly Payment: | $ 950.66 | Current Loan Balance: | $ 108,925.72 |
| | | Original Loan Balance: | $ 109,867.00 |
| Bi-Weekly Transfer: | $ 477.83 | Estimated Activity to Date: | |
| loan Origination Date: | 05-Mar-1998 | Principal Paid to Date: $ | 941.28 |
| loan Origination Term: | 30 Years | Interest Paid to Date: $ | 8,8618.55 |
| Loan Payment Due Day: | 1 | Total Payments to Date:$ | 9,559.83 |

⎫ 22

(See Fig. 2B)

*FIG. 2A*

*(See Fig. 2A)*

| Your Existing Payment | | vs. | Equity Accelerator | |
|---|---|---|---|---|
| Program Year | Existing Equity Growth | | Accelerated Equity Growth | Accelerated Equity Advantage | Cumulative Interest Saved |
| 5 | $ 6,931.05 | | $ 11,356.52 | $ 4,425.47 | $ 735.01 |
| 10 | $ 15,799.63 | | $ 27,846.20 | $ 12,046.57 | $ 3,927.80 |
| 15 | $ 28,930.68 | | $ 52,261.22 | $ 23,330.54 | $ 10,783.46 |
| 20 | $ 48,372.82 | | $ 88,410.68 | $ 40,037.86 | $ 23,062.49 |
| 22 | $ 59,942.18 | | $109,897.00 | $ 49,924.82 | $ 31,012.44 |
| 29 | $109,867.00 | | | | $ 45,610.92 |

Your Interest Savings  $ 45,610.92

*SendNoMoney!*

There is no application fee, start up fee or other front end fee, nor is there any fee for payment changes or cancellation. You can even transfer the service to a new loan FREE of charge. The one-time lifetime program fee of $295 (collected from your first extra principal payment) and the $5.42 monthly participation fee (a portion is collected with each funds transfer) total less that 4% of your projected interest savings of $45,610.92. Interest savings shown above are after profiding for fees.

This statement is to be used for comparative purposes only. No guarantee or warranty is made with respect to the accuracy of the contents or use of this with regard to financial investments. This estimate of benefits may change due to adjustments in load interest rate, monthly tax and insurance amount, additional principal payments, withdrawl cycle, termination, suspension or if calculated on a different date.

Detach Here

Copyright 1999, Aegis Mortgage Acceleration Corp. All Rights Reserved.

*(See Fig. 2C)*

Equity Accelerator Authorization — Please read carefully. If enrolling by phone, retain this Authorization for your records.

I authorize Market Street Mortgage or its agent to initiate transfers from my designated account to make monthly payments to my mortgage.

I understand that before any withdrawls are made from my bank account, I will receive a Welcome Letter specifying the exact dollar amounts and dates for the electronic funds transfers.

I understand that you will make my regular mortgage payment beginning the month after withdrawls have begun from my designated bank account.

I understand that this agreement and the services undertaken by Market Street Mortgage in no way alter or lessen my obligations under my existing mortgage contract regarding the amount of the monthly payments, when payments are due, the application of payments, the assessment of late charges or the calculation of delinquncies.

I understand that the one-time lifetime program fee of $295 will be automatically taken out of my first extra payment to principal, and that there is a monthly participation fee of $5.42 (a portion of the monthly fee will be collected with each funds transfer).

I agree to be bound by the program's Terms and conditions (which will be mailed to me before any withdrawl of funds).

I understand that I can cancel this service at any time by giving Market Street Mortgage written notice at least (30) days in advance of the requested close date.

(See Fig.2B)

| Special Requests (optional): |
|---|
|  |
|  |
|  |
|  |

Equity Accelerator Enrollment Processing Center P.O. Box 191090 San Francisco, CA 94119-1090

METHOD AND APPARATUS FOR PREAUTHORIZING ELECTRONIC FUND TRANSFERS WITHOUT ACTUAL WRITTEN AUTHENTICATION

BACKGROUND OF THE INVENTION

1. Technical Field

The invention relates to electronic fund transfers. More particularly, the invention relates to a method and apparatus for preauthorizing electronic fund transfers without obtaining actual written authentication.

2. Description of the Prior Art

Perhaps no industry is more regulated by the Federal government than the financial services industry. It is difficult to bring new financial products to market because of this regulatory environment. Yet the growth of the Internet and electronic commerce has thrust the need for more creativity on purveyors of financial products in meeting the letter and spirit of these regulations when offering new or enhanced types of products that exploit the rapidly expanding ability to perform almost any type of transaction electronically. In the context of a financial institution, such electronic transactions are generically referred to as electronic fund transfers (EFTs). EFTs are of many types. For example, EFTs can be preauthorized, such that recurring electronic transactions may be implemented.

As an example of the regulations imposed upon financial institutions with regard to EFTs, consider 12 CFR Part 205 [Regulation E], which implements the Electronic Fund Transfer Act (EFTA). Section 205.10 of the EFTA sets forth the substantive and disclosure requirements for authorizing preauthorized transfers to and from a consumer's account. A key provision of the EFTA is Section 205.10(b) Written authorization for preauthorized transfers from consumer's account ("Preauthorized electronic fund transfers from a consumer's account may be authorized only by a writing signed or similarly authenticated by the consumer. The person that obtains the authorization shall provide a copy to the consumer.").

Within Section 205.10(b) is the notion that EFTs may be "similarly authenticated." This aspect of the EFTA would seem to provide a mechanism for overcoming the onerous requirement of obtaining written authorization for all EFTs. The National Automated Clearing House Association (NACHA) addressed what constitutes "similar" authentication in its Policy Statement On Spontaneous Internet Purchase (2 Dec. 1997), in which it stated: "The term similarly authenticated includes the use of a digital signature or other code. To meet the requirement that an authorization be in writing, an electronic authorization must be able to be displayed on a computer screen or other visual display that enable the consumer to read the communication. The authorization also must be readily identifiable as an authorization, must clearly and conspicuously state its terms, and must provide that the receiver may revoke authorization only by notifying the Originator . . . " (Subsection 2.1.2, Receiver Authorization and Agreement)

The Board of Governors of the Federal Reserve System has provided an Official Staff Interpretation (1 May 1996) of the "similarly authenticated" requirement of the EFTA, stating: " . . . for a home banking system to satisfy the [similarly authenticated] requirement, there must be some means to identify the consumer (such as a security code), and the consumer must have the ability to obtain a printed copy of the authorization . . . . Preauthorized transfers in an electronic system should be authenticated by a method that provides the same assurance as a signature in a paper-based system."

While the "similarly authenticated" requirement of EFTs has been explained, no suggestion is provided with regard to its implementation in an electronic system. The "use of a digital signature or other code" may be sufficient discussion to enable those skilled in the art to adapt their systems to comply with such requirement in some cases. However, the technical obstacles to surmount in addressing the strict requirements of such regulations presently prevent financial institutions from offering a variety of financial products. Further, such techniques as may be known for providing a digital signature or other code involve the use of computers, yet many consumers do not own computers or, if they do own computers, they are not necessarily sufficiently versed in the use of their computers to generate the necessary "digital signature or other code."

An example of a financial product that could be offered by, or on behalf of, a financial institution through a direct marketing program is a mortgage acceleration product. Such product is often offered to a mortgagee during the term of the mortgage as a vehicle for reducing overall costs of the mortgage. Such product is typically offered through a direct marketing solicitation as a value added mortgage option that the mortgagee may purchase. Key to such product is the ability of the mortgagor to withdraw mortgage payments from the mortgagee's account on a regular basis, for example by EFT.

There is presently no mechanism available for a financial institution to offer such value added financial products to consumers as part of a direct marketing effort, while at the same time complying with the requirements of the EFTA, in the absence of actual written authorization from the consumer. It would be advantageous to provide a method and apparatus for preauthorizing electronic fund transfers without obtaining actual written authentication.

SUMMARY OF THE INVENTION

The invention provides a method and apparatus for preauthorizing electronic fund transfers from a consumer's bank account without obtaining actual written authentication from the consumer. The preferred embodiment of the invention is implemented in connection with a direct marketing program for a financial product which, in the presently preferred embodiment of the invention, is a mortgage acceleration program. The invention provides for the mailing of a solicitation to a consumer, i.e. a prospective customer, based upon such factors as mortgage data that the financial institution may posses concerning the consumer. The mailing includes an authorization and passcode which, in the presently preferred embodiment of the invention, is an ACH authorization and passcode.

When the consumer receives the solicitation, he may decide to enroll in the mortgage acceleration program. The consumer places a telephone call to a telemarketing organization at a telephone number that accompanied the solicitation or he may access a service organization Web site. The consumer provides the passcode to a representative of the telemarketing organization and the telemarketing organization attempts to verify the passcode (or the consumer may input the passcode into the Web site, if access by the consumer is via the internet instead of by telephone). If the passcode is successfully verified, then the consumer is enrolled in the mortgage acceleration program, or other financial product being marketed.

Thus, the invention provides a deceptively simple and specific implementation of the "similarly authenticated" requirement of the EFTA that is applicable to direct marketing solicitations made by, or on behalf of, financial institutions. That is, the passcode provided by the consumer meets the requirement of a "digital signature or other code." Yet, the consumer is not required to provide an actual written signature, nor is the consumer required to use a computer or other electronic means to conclude the transaction. The protection lies in the control of the passcode, its randomness, and assignment to a specific control.

BRIEF DESCRIPTION OF THE DRAWINGS

FIGS. 1A-1C are a first page of a form letter sent to a consumer as a solicitation for participation in a mortgage acceleration program according to the invention;

FIGS. 2A-2C are a second page of a form letter sent to a consumer as a solicitation for participation in a mortgage acceleration program according to the invention.

DETAILED DESCRIPTION OF THE INVENTION

The invention provides a method and apparatus for preauthorizing electronic fund transfers from a consumer's bank account without obtaining actual written authentication from the consumer. The invention is implemented in connection with a direct marketing scheme for a financial product which, in the presently preferred embodiment of the invention, is a mortgage acceleration program. The invention provides for the mailing of a solicitation to a consumer, i.e. a prospective customer, based upon such factors as mortgage data that the financial institution may posses concerning the consumer. The mailing includes an authorization and passcode which, in the presently preferred embodiment of the invention, is an ACH authorization and passcode.

When the consumer receives the solicitation, he may decide to enroll in the mortgage acceleration program. The consumer places a telephone call to a telemarketing organization at a telephone number that accompanied the solicitation. The consumer provides the passcode to a representative of the telemarketing organization and the telemarketing organization attempts to verify the passcode. If the passcode is successfully verified, then the consumer is enrolled in the mortgage acceleration program. Alternatively, the consumer may access a service organization at a Web site via the Internet.

Thus, the invention provides a deceptively simple and specific implementation of the "similarly authenticated" requirement of the EFTA that is applicable to direct marketing solicitations made by, or on behalf of, financial institutions. That is, the passcode provided by the consumer meets the requirement of a "digital signature or other code." Yet, the consumer is not required to provide an actual written signature, nor is the consumer required to use a computer or other electronic means to conclude the transaction. The protection lies in the control of the passcode, its randomness, and assignment to a specific customer.

It will be appreciated by those skilled in the art that, while the invention is explained in the context of a mortgage acceleration program, the invention is readily applied to other financial products, as well as to other regulated industries which require written authorization from a consumer prior to obligating the consumer to honor a purchase or permitting the consumer to conclude the purchase even of a limited distribution product, e.g. the sale of firearms or prescription drugs.

The exemplary mortgage acceleration program withdraws funds electronically from a mortgagee's checking or savings account via the ACH system and makes monthly mortgage payments and accelerated mortgage payments to the mortgagee's mortgage servicer. The program does not change the mortgage terms or payment due date. The only differences for the mortgage servicer are that the monthly payment are received electronically and there are additional periodic reductions of principal.

For example, when a mortgagee elects a standard bi-weekly payment schedule, one-half the mortgage payment is collected every other week, 26 times a year. These payments are transferred electronically from the mortgagee's checking or savings account and deposited into an interest-bearing custody account established by a sponsoring partner. Regular mortgage payments are made to the mortgage servicer monthly.

By making 26 bi-weekly withdrawals from the mortgagee's account, the equivalent of 13 monthly mortgage payments is collected annually. The two extra bi-weekly payments, plus any interest earned, are sent to the mortgage servicer twice a year to be applied directly to principal and reduce the loan balance. Similar plans are available for weekly, semi-monthly, and monthly pay cycles.

The mortgage acceleration product is well suited for sale to consumers via direct marketing, e.g. as a mail order product. Using predictable selection and exclusion criteria, prospective customers are identified and then approached via direct mail. Each consumer approached receives a personalized letter which articulates the consumer's specific mortgage information and which describes the potential benefits which could be realized by joining the program. This personalized solicitation results from a process which extracts individual mortgage information electronically from a sponsor furnished database, calculates benefits based on the data, and detail the benefits of enrollment in the solicitation letter.

Figure 1A:
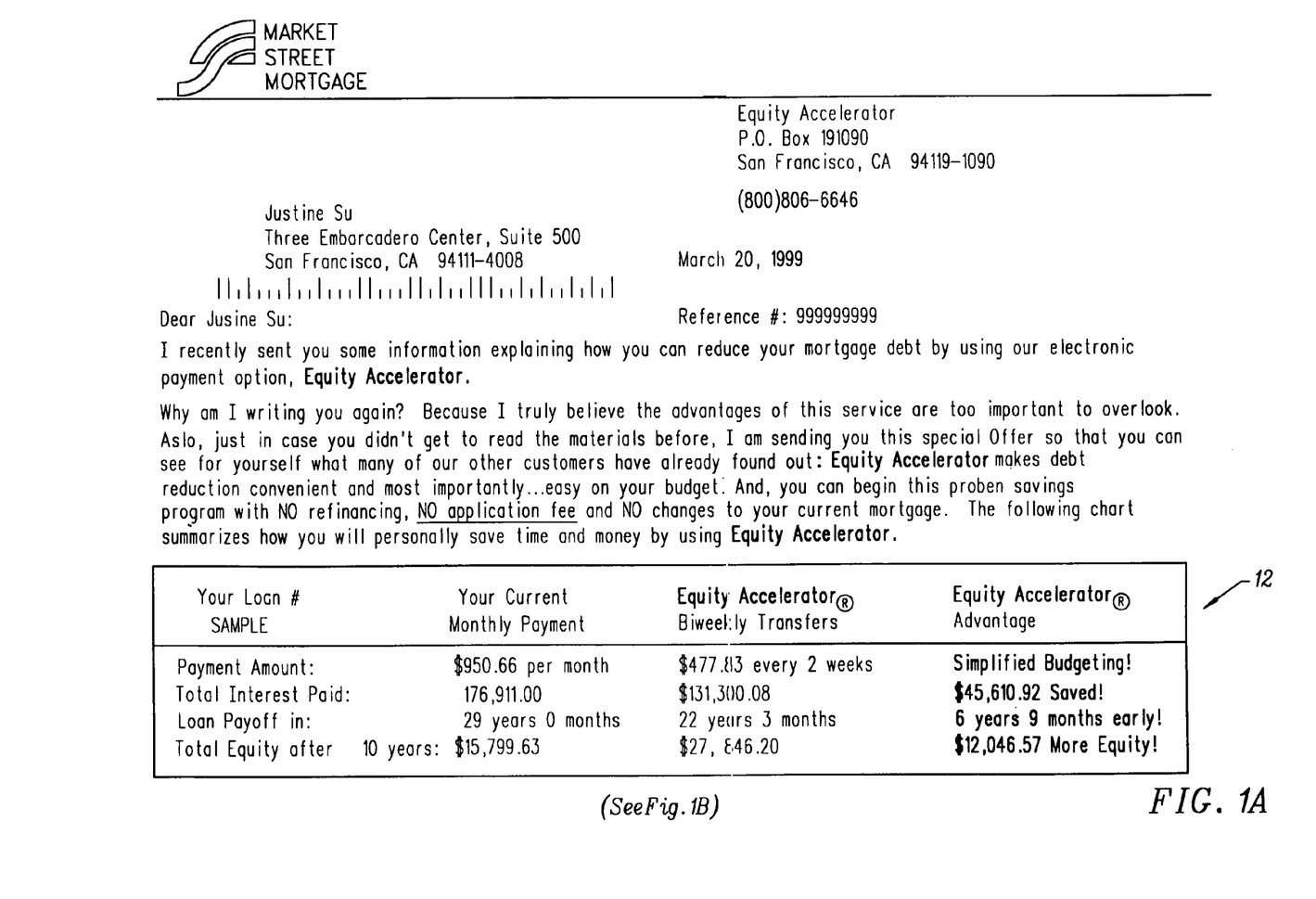
Figure 1C:
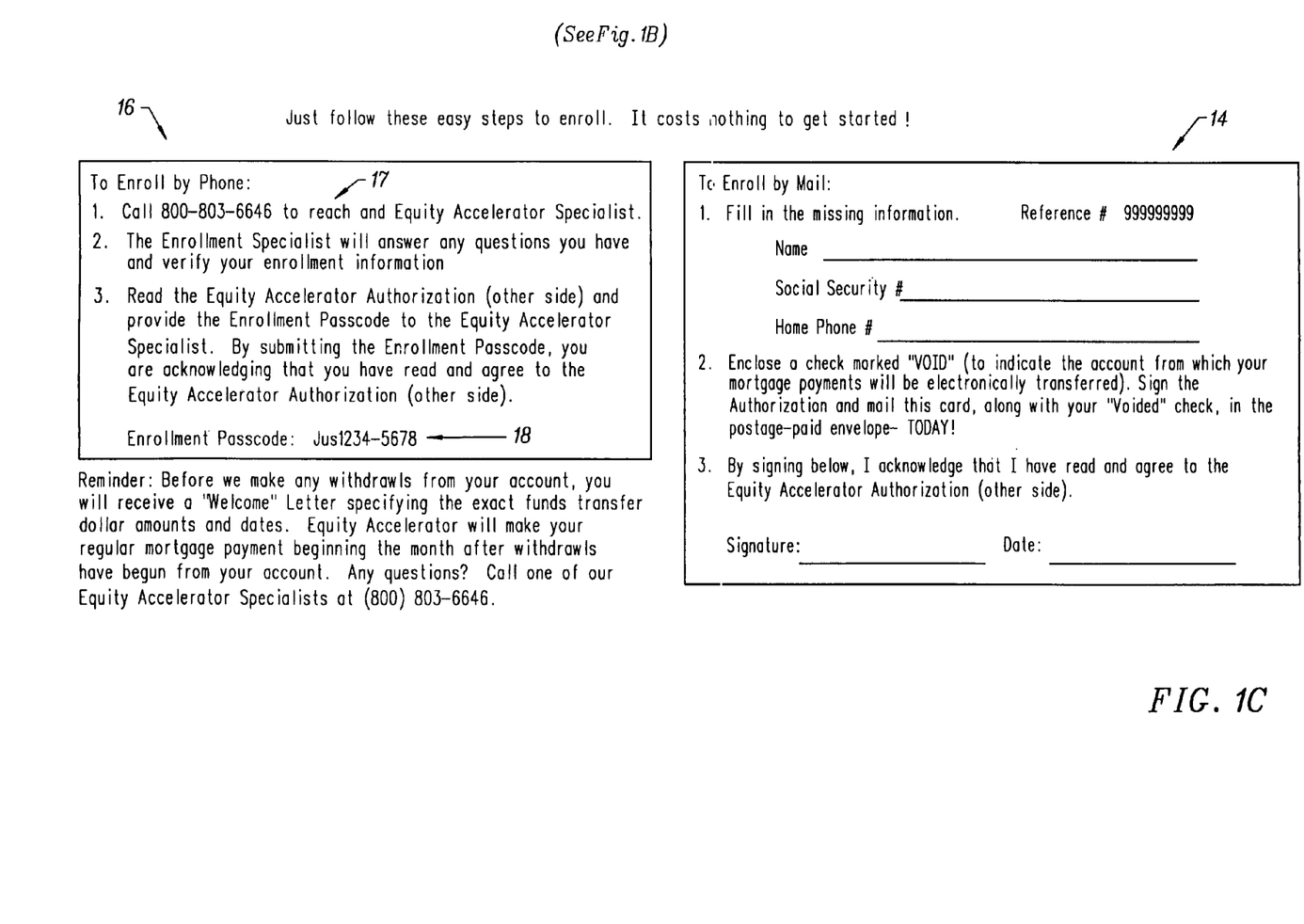

FIGS. 1A-1C are a first page of a form letter sent to a consumer as a solicitation for participation in a mortgage acceleration program according to the invention. Such letter typically includes a benefits chart 12 which graphically illustrates the savings a consumer may expect if enrolled in the program. The consumer is presented with an option to enroll by mail 14. By signing the form and mailing it to the direct marketing organization or financial institution that is sponsoring the program, the consumer accepts the program in a legally binding way that is consistent with the written authorization requirement of the EFTA, i.e. the consumer has actually signed the document.

It has been found that it is often difficult to overcome a consumer's inertia with regard to actually signing and mailing a document, even where a prepaid envelope is included in the mailing that is sent to the consumer. A key feature of the invention allows the consumer to enroll in the program by telephone. This feature of the offering makes the likelihood of acceptance of the program by the consumer much greater because of the convenience it offers the consumer. Thus, the form letter includes an Enroll By Phone section 16 that provides the consumer with a toll free telephone number 17 that may be called to enroll in the program. The Enroll By Phone section also includes an Enrollment Passcode 18, which in the preferred embodiment of the invention is an ACH passcode.

The passcode allows the consumer to enter into a binding financial transaction that is in full compliance with the written authorization requirement of the EFTA. In this way, the consumer may enroll in the program and authorize the sponsoring financial institution to make regular withdrawals from the consumer's checking or savings account via the ACH system. Significantly, the invention provides a simple and elegant mechanism that allows financial institutions to offer various financial products to prospective customers through a direct marketing campaign, where the consumer may purchase such product and preauthorize access to a savings or checking account by a simple telephonic transaction, all in compliance with the requirements of the EFTA.

Figure 2A:
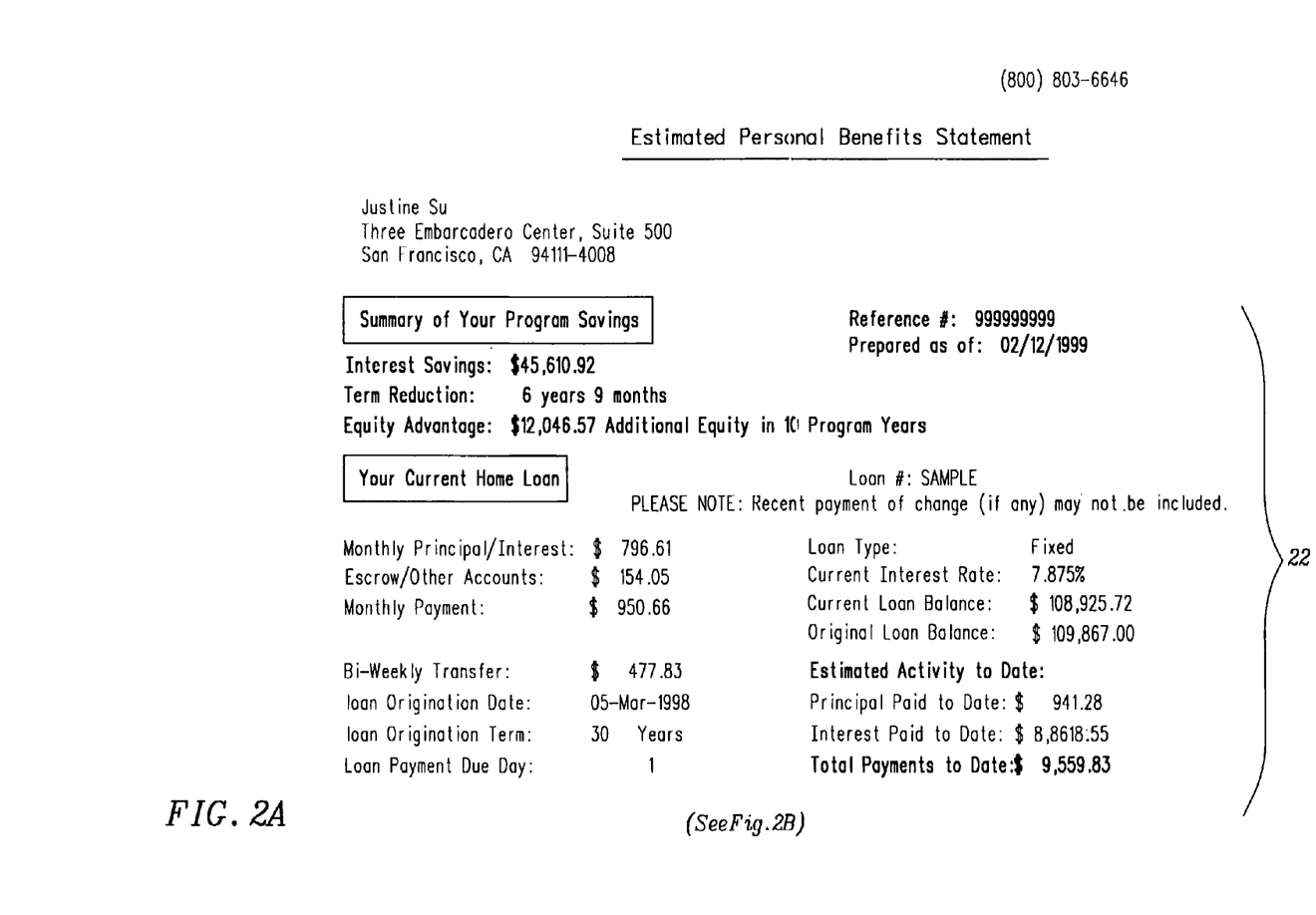

FIGS. 2A-2C are a second page of a form letter sent to a consumer as a solicitation for participation in a mortgage acceleration program according to the invention. The second page of the offering form letter includes a more detailed breakdown 22 of the benefits and costs to the consumer of participating in the program. This detailed breakdown is prepared in such matter as to comply with any disclosure and consumer protection laws that may affect the financial product offered to the consumer.

The second page of the offering form letter also includes a form of contract and ACH authorization 20 that specifies the terms and conditions of the agreement that the consumer is entering into by providing authorization to the direct marketer or sponsoring financial institution. Again, the terms and conditions of the agreement are drafted in full compliance with any applicable consumer protection laws.

The invention is readily applied to other types of transactions that require written acceptance by a consumer. While various schemes are known for providing electronic authorization using computers and other electronic instruments, the invention simplifies the authorization process by providing a specific written passcode that identifies the consumer uniquely to the direct marketer or sponsoring financial institution without the need for such computers or other electronic devices. Rather, the consumer merely needs to utter the passcode to provide the equivalent of a written signature. Thus, the Enrollment Passcode serves as a verbal signature.

Figure 3:
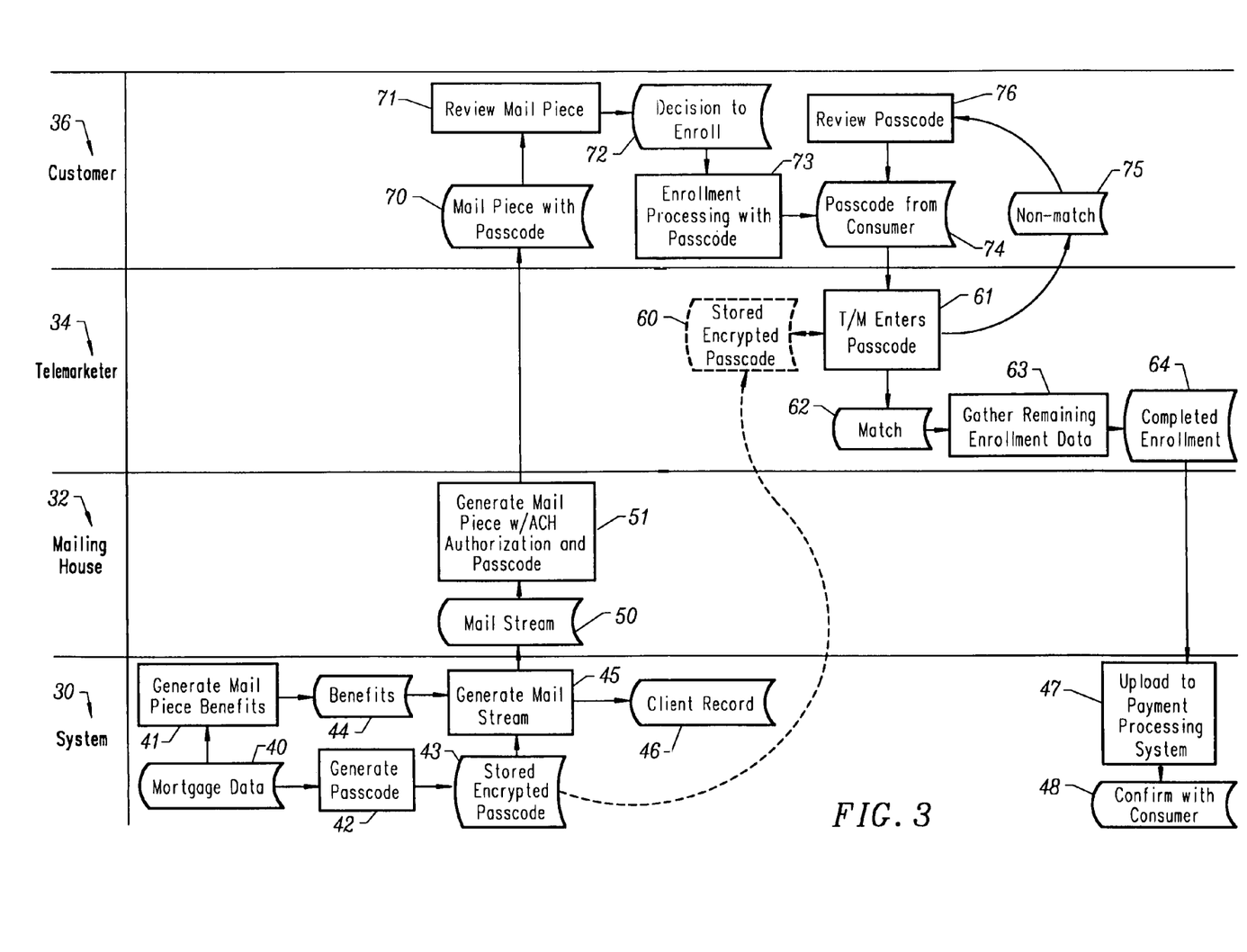
FIG. 3 is a block schematic diagram of an electronic authorization data flow according to the invention.

FIG. 3 is a block schematic diagram of an electronic authorization data flow according to the invention. The invention comprises four entities, i.e. the system 30, a mailing house 32, a telemarketer 34, and a customer 36. The interaction of these entities is now discussed.

The system may comprise any computer system, such as a personal computer, workstation, or other system. The process of enrolling a consumer in a program as discussed above begins when financial data relating to the consumer, in this example mortgage data 40, is provided to the system by a proprietor of such data, e.g. a sponsoring financial institution, marketing organization, or mortgage servicer. Such information is used to generate a mail piece 41 in which personalization is applied to produce a benefit chart (discussed above) which illustrates the actual benefits 44 conferred upon the consumer by enrollment in the program.

The mortgage data and/or other attributes associated with the consumer, and/or a random numbers are also used to generate a unique passcode 42 that identifies the consumer in a secure and reliable fashion. Various techniques are known for generating a passcode. for example, the passcode may be a hash or a message digest (e.g. using MD5™) of the consumer's mortgage data. A pseudo random number generator may also be used. Many other techniques are known to those skilled in the art for creating a code that uniquely identifies an individual, especially where the code is created from information that is particular to the individual who uses the code, e.g. where the code is derived from the consumer's account or mortgage information. The passcode thus generated is encrypted to secure the passcode against unauthorized use, and stored for later use during an enrollment cycle 43. Various encryption techniques are known, such as those provided by RSA's PGP program, Diffie Hilman techniques, LZ techniques, and others.

The personalized mail piece is merged with the passcode and a mail stream is then generated 45. An image of the mail stream is stored in the system, such that a client record 46 is preserved in a database for each solicitation.

A mailing house receives the mail stream 50 and generates a mailing that includes an ACH authorization and passcode 51. The mailing house may be any known mailing service.

The ACH network is a nationwide system that processes electronic payments on behalf of banks, savings and loan associations, and credit unions. The ACH network uses high speed computers and telecommunications to transfer funds and payment related information. The Federal Reserve Bank, American Clearing House, New York Clearing House, and VisaNet ACH serve as ACH Operators, processing ACH transactions and information.

Electronic ACH services fall into two broad categories: consumer payments and corporation payments. It is estimated that 80% of all ACH transactions are in the consumer category. Some consumer ACH services include:

Direct Deposit of payroll, dividends, interest, annuities, pension and investment income.

Direct Deposit of Federal Government payments including Social Security benefits.

Payment of insurance premiums, utility bills, mortgage and rental bills, installment loans and contributions.

Electronic debiting through Point-of-Sale (POS) debit cards.

Home banking and telephone bill payment.

The invention is readily implemented in cooperation with the ACH network, and no additional financial systems need be put in place to practice the invention. Operation of the ACH network is well known to those skilled in the art and well documented. Accordingly, the ACH network is not discussed herein in any greater detail. Those desiring additional information about the ACH network can contact the National Automated Clearing House Association, 13665 Dulles Technology Drive, Suite 300 Herndon, Va. 20171.

The consumer receives the mail piece with the passcode 70 and may decide to reviews the mail piece 71. If the consumer is interested in the program, he decides to enroll 72. As discussed above, the consumer may elect to sign and mail the form letter to the marketer, in which case the invention is not used.

However, it is considered to be significantly more convenient for the consumer to call a toll free telephone number and enroll by telephone. Thus, by using the invention, the direct marketer or sponsoring financial institution is more likely to sell their financial product to the consumer. In this case, the consumer proceeds with enrollment processing using the passcode that accompanied the mail piece 73.

The consumer dials the toll free telephone number that accompanies the mail piece and provides the passcode to the telemarketer 74. The telemarketer enters the passcode into a system 61 which may be the system 30 described above or may be a remote system that is linked to the system 30 via a network or telephone connection. When the telemarketer enters the consumer's passcode, the stored encrypted passcode 60 for the consumer is retrieved and matched to the passcode provided by the consumer 62. If the passcode provided by the consumer does not match that stored in the system 75, the consumer is given an opportunity to review the passcode 76 and provide it to the telemarketer again. This allows the consumer to correct a mistake that may have been made in giving the passcode to the telemarketer, for example if the telemarketer did not hear the consumer correctly.

The use of a passcode is key to the invention. It provides a method for verifying that the consumer is who he says is, i.e. it provides a measure of non-repudiation. Thus, the mail piece is merged with the passcode in such fashion that the identity of the consumer is ascertained from the passcode when the passcode is presented to the telemarketer by the consumer. Only the consumer has the passcode, it is not displayed to telemarketers. Therefore, if it has been correctly entered, it must have been provided by consumer. When the consumer gives his passcode to the telemarketer it is equivalent to giving his signature. Thus, the consumer's agreement to enroll in the program is similar to a written authorization, i.e. it is similarly authenticated.

Once a passcode match is ascertained by the telemarketer, the telemarketer gathers any remaining enrollment data that may be necessary to complete the enrollment process 63. Once enrollment is completed 64, the transaction is uploaded to a payment processing system 47 and the consumer's enrollment is confirmed with the consumer 48. This reconfirmation of the consumer's enrollment further assures that the consumer desires to participate in the program and serves as a second check on the identity of the consumer. Thus, any consumer protection laws relating to cancellation of agreements and the like are also observed by use of the invention. Thereafter, the consumer participates in the program, for example mortgage payments are withdrawn from the consumer's checking or savings account on a regular basis.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for preauthorizing electronic fund transfers from a consumer's bank account without obtaining actual written authentication from said consumer, comprising the steps of:
    mailing a printed solicitation to a pre-selected consumer;
    providing a printed authorization and passcode with said mailing, wherein the passcode is derived from the consumer's bank account information or recurring debt obligation information, where the recurring debt obligation is related to said solicitation;
    said consumer placing a telephone call to a marketing organization at a telephone number that accompanied said solicitation or alternatively accessing a specified Web site if said consumer decides to accept an offer that accompanied said solicitation, said offer requiring said consumer's preauthorization of electronic fund transfers from said consumer's bank account;
    said consumer providing said passcode printed on said solicitation to said marketing organization to thereby provide authentication of preauthorizing of electronic funds transfers from the consumer's bank account without giving actual written authentication of said preauthorization;
    said marketing organization attempting to verify said passcode; and
    said marketing organization completing a transaction with said consumer based upon the terms of the offer that accompanied said solicitation if said passcode is successfully verified;
    wherein said consumer has preauthorized electronic fund transfers from said consumer's bank account without said marketing organization representative obtaining actual written authentication from said consumer; and the solicitation relates to a financial product involving the recurring debt obligation of the consumer and a recurring payday period of the consumer, wherein the preauthorized electronic fund transfers involve a pay-day-to-payday schedule of allocating funds from the consumer's recurring payday period for payment against the consumer's debt obligation, such that one or more additional payday periods occur after payment against the recurring debt are made according to the schedule and are used for additional payment against the debt.

2. The method of claim 1, wherein said solicitation comprises:
    a direct marketing program for a financial product.

3. The method of claim 2, wherein said financial product is a mortgage acceleration program.

4. The method of claim 1, wherein said authorization and passcode comprise:
    an ACH authorization and passcode.

5. The method of claim 1, wherein said passcode complies with the similarly authenticated requirement of the Electronic Funds Transfer Act (EFTA).

6. The method of claim 3, wherein said mortgage acceleration program withdraws funds electronically from said consumer's checking or savings account via the ACH system according to a consumer specified or preferred pattern and makes monthly mortgage payments and accelerated mortgage payments to a mortgage servicer.

7. The method of claim 3, wherein said solicitation comprises:
    a personalized letter to said consumer which articulates said consumer's specific mortgage information and which describes potential benefits which said consumer could realize by joining said program.

8. The method of claim 3, wherein said solicitation includes an Enroll By Phone section that provides said consumer with a toll free telephone number that may be called to enroll in said program; and wherein said Enroll By Phone section also includes an Enrollment Passcode.

9. The method of claim 3, wherein said solicitation includes a form of contract that specifies terms and conditions of an agreement that said consumer enters into by providing said passcode to said telemarketing organization representative.

10. A system for preauthorizing electronic fund transfers from a consumer's bank account without obtaining actual written authentication from said consumer, comprising:
    a computer configured to generate a passcode, wherein the passcode is derived from the consumer's bank account information or a recurring debt obligation information, where the recurring debt obligation is related to said solicitation;
    a printed solicitation including a printed authorization and said passcode, said solicitation conveying an offer to said consumer that requires said consumer's preauthorization of electronic fund transfers from said consumer's bank account;
    a mailing house for mailing said printed solicitation to said consumer;
    a marketing organization, wherein said consumer places a telephone call to said marketing organization at a telephone number that accompanied said solicitation or alternatively accessing a specified Web site if said consumer decides to accept said offer;
    wherein said consumer provides said passcode printed on said solicitation to a representative of said marketing organization to thereby provide authentication of preauthorizing of electronic funds transfers from the consumer's bank account without giving actual written authentication of said preauthorization;

wherein said marketing organization representative attempts to verify said passcode;

wherein said marketing organization completes a transaction with said consumer based upon the terms of said offer if said passcode is successfully verified; and wherein said consumer has preauthorized electronic fund transfers from said consumer's bank account without said marketing organization obtaining actual written authentication from said consumer and the solicitation relates to a financial product involving the recurring debt obligation of the consumer and a recurring payday period of the consumer, wherein the preauthorized electronic fund transfers involve a payday-to-payday schedule of allocating funds from the consumer's recurring payday period for payment against the consumer's debt obligation, such that one or more additional payday periods occur after payment against the recurring debt are made according to the schedule and are used for additional payment against the debt.

11. The system of claim 10, wherein said solicitation comprises:
   a direct marketing program for a financial product.

12. The system of claim 11, wherein said financial product is a mortgage acceleration program.

13. The system of claim 10, wherein said authorization and passcode comprise:
   an ACH authorization and passcode.

14. The system of claim 10, wherein said passcode complies with the similarly authenticated requirement of the Electronic Funds Transfer Act (EFTA).

15. The system of claim 12, wherein said mortgage acceleration program withdraws funds electronically from said consumer's checking or savings account via the ACH system and makes monthly mortgage payments and accelerated mortgage payments to said consumer's mortgage servicer.

16. The system of claim 12, wherein said solicitation comprises:
   a personalized letter to said consumer which articulates said consumer's specific mortgage information and which describes potential benefits which said consumer could realize by joining said program.

17. The system of claim 12, wherein said solicitation includes an Enroll By Phone section that provides said consumer with a toll free telephone number that may be called to enroll in said program; and wherein said Enroll By Phone section also includes an Enrollment Passcode.

18. The system of claim 12, wherein said solicitation includes a form of contract that specifies terms and conditions of an agreement that said consumer enters into by providing said passcode to said telemarketing organization representative.

19. A process for enrolling a consumer in a financial services program, comprising the steps of:
   using financial data relating to said consumer to generate a mail piece to which personalization is applied to produce a benefit chart which illustrates actual benefits conferred upon said consumer by enrollment in said program;
   using said financial data to generate a unique passcode that identifies said consumer in a secure and reliable fashion, wherein the passcode is derived from the consumer's bank account information or a recurring debt obligation information, where the recurring debt obligation is related to said financial data;
   merging said mail piece with said passcode, such that said passcode is printed on said mail piece;
   generating a mail stream;
   storing an image of said mail stream to preserve a client record of each solicitation;
   generating a mailing to said consumer from said mail stream;
   said consumer proceeding with program enrollment processing using said passcode that accompanied said mail piece by dialing a telephone number that accompanies said mail piece and providing said passcode to a telemarketer to thereby provide authentication of preauthorizing of electronic funds transfers from the consumer's bank account without giving actual written authentication of said preauthorization;
   said telemarketer entering said passcode into a system, wherein a passcode stored in said client record for said consumer is retrieved and compared to said passcode provided by said consumer;
   said telemarketer gathering any remaining enrollment data that may be necessary to complete said enrollment process if a passcode match is ascertained by said telemarketer;
   uploading said transaction to a payment processing system; and
   confirming said consumer's enrollment is said program with said consumer;
   wherein the financial services program relates to the recurring debt obligation of the consumer and a recurring payday period of the consumer, wherein the preauthorized electronic fund transfers involve a payday-to-payday schedule of allocating funds from the consumer's recurring payday period for payment against the consumer's debt obligation, such that one or more additional payday periods occur after payment against the recurring debt are made according to the schedule and are used for additional payment against the debt.

20. The process of claim 19, wherein said passcode is encrypted to secure the passcode against unauthorized use; and wherein said passcode is stored for later use during an enrollment cycle.

21. The process of claim 19, wherein said mailing that includes an ACH authorization and passcode.

22. The process of claim 19, wherein said consumer is given an opportunity to review said passcode if said passcode provided by said consumer does not match a passcode stored in said system for said consumer.

23. The process of claim 19, wherein said mail piece is merged with said passcode in such fashion that the identity of said consumer is verified from said passcode when said passcode is presented to said telemarketer by said consumer.

24. An apparatus for preauthorizing electronic fund transfers from a consumer's bank account without obtaining actual written authentication from said consumer, comprising:
   a computer configured to generate an authorization and passcode, wherein said passcode complies with the similarly authenticated requirement of the Electronic Funds Transfer Act (EFTA), and wherein said passcode is derived from the consumer's bank account information or a recurring debt obligation information, where the recurring debt obligation is related to said solicitation; and
   a printed solicitation, wherein said solicitation conveys an offer to said consumer that requires said consumer's preauthorization of electronic fund transfers from said consumer's bank account, said printed solicitation comprising:
      a personalized letter to said consumer which articulates said consumer's specific financial information and which describes potential benefits which said consumer could realize by accepting said offer;

wherein said solicitation includes an enroll by phone section that provides said consumer with a telephone number that may be called to accept said offer; wherein said enroll by phone section also includes said passcode; and wherein said solicitation includes a form of contract that specifies terms and conditions of an agreement that said consumer enters into by providing said passcode to a marketing organization representative to thereby provide authentication of preauthorizing of electronic funds transfers from the consumer's bank account without giving actual written authentication of said preauthorization, and the solicitation relates to a financial product involving the recurring debt obligation of the consumer and a recurring payday period of the consumer, wherein the preauthorized electronic fund transfers involve a payday-to-payday schedule of allocating funds from the obligation, such that one or more additional payday periods occur after payment against the recurring debt are made according to the schedule and are used for additional payment against the debt.

25. The apparatus of claim 24, further comprising:
a mailing house for mailing said printed solicitation to said consumer;

a telemarketing organization, wherein said consumer places a telephone call to said telemarketing organization at a telephone number that accompanied said solicitation if said consumer decides to accept said offer;

wherein said consumer repeats said passcode printed on said solicitation to a representative of said telemarketing organization during the progress of said telephone call;

wherein said telemarketing organization representative attempts to verify said passcode;

wherein said telemarketing organization representative completes a transaction with said consumer based upon the terms of said offer if said passcode is successfully verified; and wherein said consumer has preauthorized electronic fund transfers from said consumer's bank account without said telemarketing organization representative obtaining actual written authentication from said consumer.

26. A method for preauthorizing electronic fund transfers from a consumer's bank account without obtaining actual written authentication from said consumer, comprising the steps of:

mailing a printed solicitation to a consumer, wherein said solicitation comprises a direct marketing program for a financial product, wherein said financial product is a mortgage acceleration program, wherein said mortgage acceleration program withdraws funds electronically from said consumer's checking or savings account via the ACH system and makes monthly mortgage payments and accelerated mortgage payments to a mortgage servicer, wherein said solicitation comprises a personalized letter to said consumer which articulates said consumer's specific mortgage information and which describes potential benefits which said consumer could realize by joining said program, wherein said solicitation includes an Enroll By Phone section that provides said consumer with a toll free telephone number that may be called to enroll in said program; and wherein said Enroll By Phone section also includes an Enrollment Passcode, wherein said solicitation includes a form of contract that specifies terms and conditions of an agreement that said consumer enters into by providing said passcode to said marketing organization representative;

providing a printed authorization and passcode with said mailing, wherein said authorization and passcode comprise an ACH authorization and passcode, wherein said passcode complies with the similarly authenticated requirement of the Electronic Funds Transfer Act (EFTA), and wherein said passcode is derived from the consumer's bank account information or the consumer's mortgage account information;

said consumer placing a telephone call to a marketing organization at a telephone number that accompanied said solicitation if said consumer decides to accept an offer that accompanied said solicitation, said offer requiring said consumer's preauthorization of electronic fund transfers from said consumer's bank account;

said consumer repeating said passcode printed on said solicitation to a representative of said marketing organization during the progress of said telephone call to thereby provide authentication of preauthorizing of electronic funds transfers from the consumer's bank account without giving actual written authentication of said preauthorization;

said marketing organization representative attempting to verify said passcode; and said marketing organization representative completing a transaction with said consumer based upon the terms of the offer that accompanied said solicitation if said passcode is successfully verified;

wherein said consumer has preauthorized electronic fund transfers from said consumer's bank account without said marketing organization representative obtaining actual written authentication from said consumer, and wherein the solicitation relates to a financial product involving the consumer the consumer's mortgage account and a recurring payday period of the consumer, wherein the preauthorized electronic fund transfers involve a payday-to-payday schedule of allocating funds from the consumer's recurring payday period for payment against the consumer's mortgage debt, such that one or more additional payday periods occur after payment against the mortgage debt are made according to the schedule and are used for additional payment against the mortgage debt.

27. A system for preauthorizing electronic fund transfers from a consumer's bank account without obtaining actual written authentication from said consumer, comprising:

a computer configured to generate a printed authorization and passcode, wherein said passcode is derived from the consumer's bank account information or the consumer's mortgage account information;

a memory associated with said computer configured to store the printed authorization and passcode;

a printed solicitation including said printed authorization and passcode, wherein said authorization and passcode comprise an ACH authorization and passcode, wherein said passcode complies with the similarly authenticated requirement of the Electronic Funds Transfer Act (EFTA), said solicitation conveying an offer to said consumer that requires said consumer's preauthorization of electronic fund transfers from said consumer's bank account; said printed solicitation comprising a personalized letter to said consumer which articulates said consumer's specific mortgage information and which describes potential benefits which said consumer could realize by joining said program, wherein said solicitation includes an Enroll By Phone section that provides said consumer with a toll free telephone number that may be called to enroll in said program; and wherein said Enroll By Phone section also includes an Enrollment Passcode, wherein said solicitation includes a form of contract that specifies terms and conditions of an agreement that said consumer enters into by providing said passcode to said marketing organization representative;

a mailing house for mailing said printed solicitation to said consumer, wherein said solicitation comprises a direct marketing program for a financial product, wherein said financial product is a mortgage acceleration program, wherein said mortgage acceleration program withdraws funds electronically on a payday-to-payday basis from said consumer's checking or savings account via the ACH system and makes monthly mortgage payments ad accelerated mortgage payments to said consumer's mortgage servicer;

a marketing organization, wherein said consumer places a telephone call to said marketing organization at a telephone number that accompanied said solicitation if said consumer decides to accept said offer;

wherein said consumer repeats said passcode printed on said solicitation to a representative of said marketing organization during the progress of said telephone call to thereby provide authentication of preauthorizing of electronic funds transfers from the consumer's bank account without giving actual written authentication of said preauthorization;

wherein said marketing organization representative attempts to verify said passcode;

wherein said marketing organization representative completes a transaction with said consumer based upon the terms of said offer if said passcode is successfully verified; and wherein said consumer has preauthorized electronic fund transfers from said consumer's bank account without said marketing organization representative obtaining actual written authentication from said consumer, and wherein the solicitation relates to a financial product involving the consumer the consumer's mortgage account and a recurring payday period of the consumer, wherein the preauthorized electronic fund transfers involve a payday-to-payday schedule of allocating funds from the consumer's recurring payday period for payment against the consumer's mortgage debt obligation, such that one or more additional payday periods occur after payment against the mortgage debt are made according to the schedule and are used for additional payment against the mortgage debt.

* * * * *